（12）United States Patent
Kurita et al.

(10) Patent No.: US 10,903,493 B2
(45) Date of Patent: Jan. 26, 2021

(54) POSITIVE ELECTRODE MATERIAL FOR SECONDARY BATTERY, METHOD FOR MANUFACTURING THE SAME, AND LITHIUM-ION SECONDARY BATTERY

(71) Applicant: FUJITSU LIMITED, Kawasaki (JP)

(72) Inventors: Tomochika Kurita, Kawasaki (JP); Jiyunichi Iwata, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 15/880,593

(22) Filed: Jan. 26, 2018

(65) Prior Publication Data
US 2018/0219226 A1    Aug. 2, 2018

(30) Foreign Application Priority Data
Feb. 1, 2017 (JP) ................. 2017-016838

(51) Int. Cl.
| H01M 4/58 | (2010.01) |
| H01M 4/525 | (2010.01) |
| H01M 10/0525 | (2010.01) |
| C01B 25/42 | (2006.01) |
| H01M 4/02 | (2006.01) |
| H01M 10/052 | (2010.01) |

(52) U.S. Cl.
CPC ........... H01M 4/5825 (2013.01); C01B 25/42 (2013.01); H01M 4/525 (2013.01); H01M 10/0525 (2013.01); H01M 10/052 (2013.01); H01M 2004/028 (2013.01)

(58) Field of Classification Search
CPC ............... H01M 4/5825; H01M 4/525; H01M 10/0525; H01M 10/052; H01M 2004/028; C01B 25/42
See application file for complete search history.

(56) References Cited

U.S. PATENT DOCUMENTS

| 2004/0206938 A1* | 10/2004 | Barker ................ H01M 4/5825 |
| | | 252/500 |
| 2011/0236757 A1 | 9/2011 | Yukawa et al. |
| 2015/0303470 A1* | 10/2015 | Honma ............... H01M 4/5825 |
| | | 429/231.5 |
| 2017/0005337 A1 | 1/2017 | Ikejiri et al. |

FOREIGN PATENT DOCUMENTS

| JP | 2002-246025 | 8/2002 |
| JP | 2011-222498 | 11/2011 |
| JP | 2016-042453 | 3/2016 |

* cited by examiner

*Primary Examiner* — Laura Weiner
(74) *Attorney, Agent, or Firm* — Fujitsu Patent Center

(57) ABSTRACT

A positive electrode material for a secondary battery, wherein the positive electrode material includes a triclinic crystal structure and is represented by $Li_{4+x}(Fe_{1-z}M_z)_{4-0.5x}(P_2O_7)_3$, where $-0.65 \leq x \leq 0.75$, $0.0 < z \leq 0.7$, and M represents a divalent metal other than Fe.

7 Claims, 6 Drawing Sheets

US 10,903,493 B2

POSITIVE ELECTRODE MATERIAL FOR SECONDARY BATTERY, METHOD FOR MANUFACTURING THE SAME, AND LITHIUM-ION SECONDARY BATTERY

CROSS-REFERENCE TO RELATED APPLICATION

This application is based upon and claims the benefit of priority of the prior Japanese Patent Application No. 2017-016838, filed on Feb. 1, 2017, the entire contents of which are incorporated herein by reference.

FIELD

The embodiments discussed herein are related to a positive electrode material for a secondary battery, a method for manufacturing the positive electrode material for the secondary battery, and a lithium-ion secondary battery that includes the positive electrode material for the secondary battery.

BACKGROUND

Secondary batteries having large energy densities have been used as a storage battery included in a mobile phone, a mobile personal computer, a sensing device, an electric vehicle, and the like.

Japanese Laid-open Patent Publication No. 2011-222498 discloses the related art.

SUMMARY

According to an aspect of the embodiments, a positive electrode material for a secondary battery, wherein the positive electrode material includes a triclinic crystal structure and is represented by $Li_{4+x}(Fe_{1-z}M_z)_{4-0.5x}(P_2O_7)_3$, where $-0.65 \leq x \leq 0.75$, $0.0 < z \leq 0.7$, and M represents a divalent metal other than Fe.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
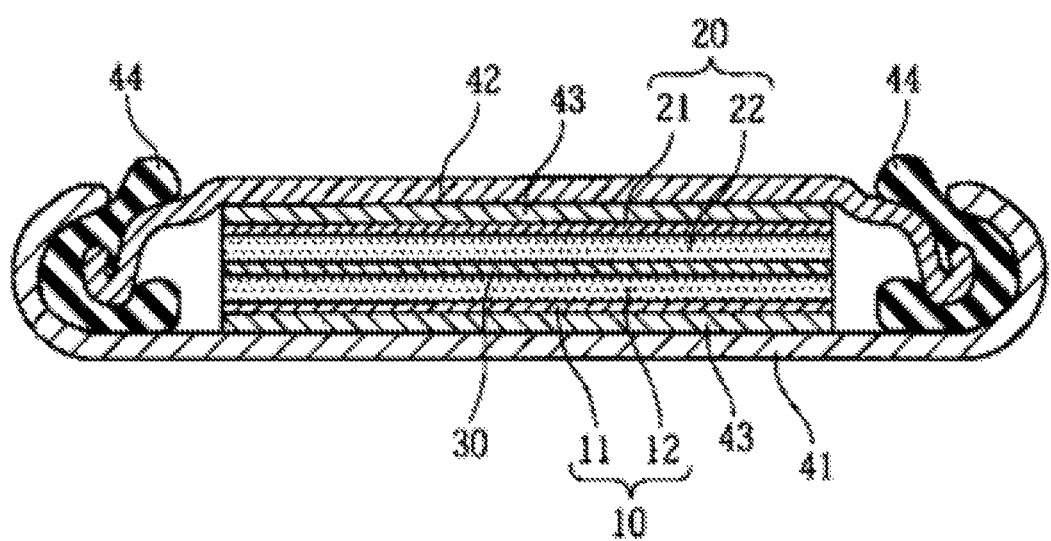
FIG. 1 illustrates an example of a lithium-ion secondary battery.

Examples of secondary batteries include a lithium-ion secondary battery.

A lithium-ion secondary battery includes a positive electrode including a positive electrode active material that causes an oxidation-reduction reaction and a negative electrode including a negative electrode active material that causes an oxidation-reduction reaction. The positive electrode active material and the negative electrode active material release energy by causing the chemical reaction. The lithium-ion secondary battery serves as a battery by extracting the released energy as electric energy.

The power at which a sensing device or the like can be driven and the amount of time during which a sensing device or the like can be driven greatly vary with the energy density of a positive electrode material included in a battery. One of the methods for producing a positive electrode material having a high energy density is to use a positive electrode material having a high potential.

Examples of a positive electrode material include $LiCoO_2$ (3.6 to 3.7 V), $LiMn_2O_4$ (3.7 to 3.8 V), and $LiFePO_4$ (3.3 to 3.4 V). Among these, $LiCoO_2$ and $LiMn_2O_4$ increase the cost of the positive electrode material since the raw materials, that is, cobalt (Co) and manganese (Mn), are expensive. For example, $LiFePO_4$ does not significantly increase the cost of the positive electrode material since it is produced using iron, which is an inexpensive element, as a raw material. However, $LiFePO_4$ has a lower potential than $LiCoO_2$ or $LiMn_2O_4$.

A positive electrode material for secondary batteries which is produced using an inexpensive element such as iron and has a potential comparable to that of $LiCoO_2$ may be provided.

The positive electrode material for secondary batteries is represented by $Li_{4+x}(Fe_{1-z}M_z)_{4-0.5x}(P_2O_7)_3$, where $-0.65 \leq x \leq 0.75$, $0.0 < z \leq 0.7$, and M represents a divalent metal other than Fe. The positive electrode material for secondary batteries has a triclinic crystal structure. The positive electrode material for secondary batteries preferably belongs to Space group P-1.

$LiCoO_2$ (3.6 to 3.7 V) and $LiMn_2O_4$ (3.7 to 3.8 V), which are positive electrode materials having a relatively high potential, contain large amounts of cobalt (Co) and manganese (Mn), respectively, which are expensive elements. Thus, using $LiCoO_2$ or $LiMn_2O_4$ as a positive electrode material increases the cost of the positive electrode material. On the other hand, using $LiFePO_4$, which is produced using inexpensive iron as a raw material, as a positive electrode material does not significantly increase the cost of the positive electrode material. However, $LiFePO_4$ has a lower potential (3.3 to 3.4 V) than $LiCoO_2$ or $LiMn_2O_4$.

A positive electrode material for secondary batteries which includes an inexpensive element such as iron and has a potential comparable to that (3.6 to 3.7 V) of $LiCoO_2$ may be provided. $Li_4Fe_4(P_2O_7)_3$ exhibits a potential comparable to that (3.6 to 3.7 V) of $LiCoO_2$. A positive electrode material for secondary batteries which is represented by $Li_4Fe_4(P_2O_7)_3$ in which Fe is partially replaced with a divalent metal may be provided. Such a positive electrode material is represented by $Li_{4+x}(Fe_{1-z}M_z)_{4-0.5x}(P_2O_7)_3$, where $-0.65 \leq x \leq 0.75$, $0.0 < z \leq 0.7$, and M represents a divalent metal other than Fe. The positive electrode material has a triclinic crystal structure. Since the positive electrode material for secondary batteries includes iron as a constituent element, it is less expensive than $LiCoO_2$. The positive electrode material for secondary batteries exhibits a potential comparable to that (3.6 to 3.7 V) of $LiCoO_2$. Depending on the type of divalent metal used, the potential of the positive electrode material for secondary batteries does not decrease even when a cycle of charge and discharge is repeated. The reason for this is presumably as follows. In a positive electrode material for secondary batteries which contains Fe, the valence of Fe fluctuates between two and three during charge and discharge. The fluctuations in the valence of Fe degrades the stability of the crystal structure of the positive electrode material during charge. It is considered that dissolving a divalent metal in the positive electrode material for secondary batteries which contains Fe may enhance the stability of the crystal structure of the positive electrode material during charge and, consequently, limit a reduction in potential due to repeated cycles of charge and discharge.

In the above composition formula, M represents a divalent metal other than Fe. The divalent metal is not limited and may be selected appropriately depending on the purpose. Examples of the divalent metal include Ni, Co, Mn, Mg, Zn, Cu, Zr, and V. The above divalent metals may be used alone or in combination of two or more. Among the above divalent metals, Ni, Co, Mn, and Mg are preferable in order to increase the potential of the positive electrode material to a high level. Using Ni and Co as a divalent metal M not only increases the potential of the positive electrode material to a high level but also suitably limits a reduction in potential due to repeated cycles of charge and discharge (hereinafter, this characteristic is referred to as "cycle characteristic").

In the above composition formula, x ranges $-0.65 \leq x \leq 0.75$, preferably ranges $-0.10 \leq x \leq 0.60$, and more preferably ranges $0.00 \leq x \leq 0.55$.

In the above composition formula, when M is Co, z preferably ranges $0.0 < z \leq 0.7$ and more preferably ranges $0.3 \leq z \leq 0.5$. In the composition formula, when M is Ni, z preferably ranges $0.0 < z \leq 0.7$ and more preferably ranges $0.3 \leq z \leq 0.5$. In the composition formula, when M is Mg, z preferably ranges $0.0 < z \leq 0.7$ and more preferably ranges $0.0 < z \leq 0.2$. In the composition formula, when M is Mn, z preferably ranges $0.0 < z \leq 0.7$ and more preferably ranges $0.0 < z \leq 0.2$.

A method for producing the positive electrode material for secondary batteries includes a heat treatment step and may include other optional steps, such as a mixing step, as appropriate.

The mixing step may be any step in which a lithium source, an iron source, a divalent metal source, and a phosphate source are mixed with one another to form a mixture of these materials and may be selected appropriately depending on the purpose. For example, a planetary ball mill may be used in the mixing step. Note that, the term "divalent metal source" used herein does not include an iron source.

Examples of the lithium source include a lithium salt. The anion included in the lithium salt is not limited and may be selected appropriately depending on the purpose. Examples of the anion include an oxide ion, a hydroxide ion, carbonate ion, an oxalate ion, an acetate ion, a nitrate anion, a sulfate anion, a phosphate ion, a fluorine ion, a chlorine ion, a bromine ion, and an iodine ion. The above anions may be used alone or in combination of two or more. The lithium salt is not limited and may be selected appropriately depending on the purpose. Examples of the lithium salt include lithium oxide ($Li_2O$), lithium hydroxide (LiOH), lithium carbonate ($Li_2CO_3$), lithium nitrate ($LiNO_3$), lithium sulfate ($Li_2SO_4$), lithium perchlorate ($LiClO_4$), lithium hexafluorophosphate ($LiPF_6$), and lithium tetrafluoroborate ($LiBF_4$). The above lithium salts may be provided in the form of a hydrate or an anhydride. Among the above lithium salts, lithium carbonate and lithium nitrate are preferable since they do not cause any side reaction.

Examples of the iron source include an iron salt. The anion included in the iron salt is not limited and may be selected appropriately depending on the purpose. Examples of the anion include an oxide ion, carbonate ion, an oxalate ion, an acetate ion, a nitrate anion, a sulfate anion, a phosphate ion, a fluorine ion, a chlorine ion, a bromine ion, and an iodine ion. The above anions may be used alone or in combination of two or more. The iron salt is not limited and may be selected appropriately depending on the purpose. Examples of the iron salt include ferrous oxide, iron(II) oxalate, iron(II) nitrate, iron(II) sulfate, and iron(II) chloride. The above iron salts may be provided in the form of a hydrate or an anhydride.

Examples of the divalent metal source include a divalent metal salt. Examples of the divalent metal salt include a nickel salt, a cobalt salt, a manganese salt, and a magnesium salt. The anion included in the divalent metal salt is not limited and may be selected appropriately depending on the purpose. Examples of the anion include an oxide ion, carbonate ion, an oxalate ion, an acetate ion, a nitrate anion, a sulfate anion, a phosphate ion, a fluorine ion, a chlorine ion, a bromine ion, and an iodine ion. The above anions may be used alone or in combination of two or more. The nickel salt is not limited and may be selected appropriately depending on the purpose. Examples of the nickel salt include nickel oxide, nickel hydroxide, nickel carbonate, nickel oxalate, nickel acetate, nickel nitrate, nickel sulfate, nickel chloride, and nickel bromide. The above nickel salts may be provided in the form of a hydrate or an anhydride. The cobalt salt is not limited and may be selected appropriately depending on the purpose. Examples of the cobalt salt include cobalt(II) oxide, cobalt hydroxide, cobalt carbonate, cobalt oxalate, cobalt acetate, cobalt nitrate, cobalt sulfate, cobalt chloride, cobalt bromide, and cobalt(II) hydroxide. The above cobalt salts may be provided in the form of a hydrate or an anhydride. The manganese salt is not limited and may be selected appropriately depending on the purpose. Examples of the manganese salt include manganese(II) oxide, manganese hydroxide, manganese carbonate, manganese oxalate, manganese acetate, manganese nitrate, manganese sulfate, manganese chloride, and manganese bromide. The above manganese salts may be provided in the form of a hydrate or an anhydride. The magnesium salt is not limited and may be selected appropriately depending on the purpose. Examples of the magnesium salt include magnesium oxide, magnesium hydroxide, magnesium carbonate, magnesium oxalate, magnesium acetate, magnesium nitrate, magnesium sulfate, magnesium chloride, and magnesium bromide. The above magnesium salts may be provided in the form of a hydrate or an anhydride.

Examples of the phosphate source include phosphoric acid and a phosphate. The cation included in the phosphate is not limited and may be selected appropriately depending on the purpose. Examples of the cation include an ammonium ion. Examples of the phosphate include ammonium phosphate, ammonium dihydrogen phosphate, and diammonium hydrogen phosphate.

Instead of the above lithium source and the phosphate source, lithium phosphate, dilithium hydrogen phosphate, lithium dihydrogen phosphate, and the like may be used as a compound that serves as a lithium source and a phosphate source.

The mixing ratio between the lithium source, the iron source, the divalent metal source, and the phosphate source is not limited and may be selected depending on the purpose. The mixing ratio between the lithium source, the iron source, the divalent metal source, and the phosphate source may be set such that the element ratio Li:Fe:M:P is, for example, 3.4 to 4.8:1.1 to 4.3:0 to 3.0:6.0. Note that, the proportion of Fe is less than 4.325 and the proportion of M is larger than 0.

The heat treatment step may be any heat treatment step in which the above mixture is heated and may be selected depending on the purpose. The temperature at which the heat treatment is performed is not limited and may be selected depending on the purpose. The heat treatment temperature is preferably 470° C. or higher and 720° C. or lower and is more preferably 500° C. or higher and 650° C. or lower. If the heat treatment temperature is lower than 470° C., the desired crystal structure may fail to be formed. If the heat treatment temperature is higher than 720° C., the substance produced by the heat treatment may become fused disadvantageously. The amount of time during which the heat treatment is performed is not limited and may be selected depending on the purpose. The heat treatment time is preferably 1 hour or more and 24 hours or less, is more preferably 2 hours or more and 18 hours or less, and is particularly preferably 3 hours or more and 15 hours or less. The above-described heat treatment is preferably performed in an inert atmosphere, such as an argon atmosphere.

A lithium-ion secondary battery includes at least the above-described positive electrode material for secondary batteries and may further include other members as appropriate.

The lithium-ion secondary battery includes the positive electrode material for secondary batteries which exhibits a potential comparable to that of $LiCoO_2$, which exhibits a relatively high potential, while including inexpensive iron. The positive electrode material having a high potential contributes an increase in energy density. Consequently, the lithium-ion secondary battery has a high energy density.

The lithium-ion secondary battery includes, for example, at least a positive electrode and may further include other members, such as a negative electrode, an electrolyte, a separator, a positive electrode casing, and a negative electrode casing, as appropriate.

The positive electrode includes at least the positive electrode material for secondary batteries according to the disclosure and may further include other components, such as a positive electrode current collector as appropriate.

In the positive electrode, the positive electrode material for secondary batteries serves as a "positive electrode active material". The content of the positive electrode material for secondary batteries in the positive electrode is not limited and may be selected depending on the purpose. The positive electrode material for secondary batteries may be included in the positive electrode in the form of a positive electrode layer composed of a mixture of the positive electrode material for secondary batteries with a conductant agent and a binder. The conductant agent is not limited and may be selected depending on the purpose. Examples of the conductant agent include carbon conductive materials, such as acetylene black and carbon black. The binder is not limited and may be selected depending on the purpose. Examples of the binder include polytetrafluoroethylene (PTFE), polyvinylidene fluoride (PVDF), an ethylene-propylene-butadiene rubber (EPBR), a styrene-butadiene rubber (SBR), and carboxymethyl cellulose (CMC).

The material for the positive electrode and the size and structure of the positive electrode are not limited and may be selected depending on the purpose. The shape of the positive electrode is not limited and may be selected depending on the purpose. Examples of the shape of the positive electrode include a rod-like shape and a disc-like shape.

The shape, size, and structure of the positive electrode current collector are not limited and may be selected depending on the purpose. The material for the positive electrode current collector is not limited and may be selected depending on the purpose. Examples of the material for the positive electrode current collector include stainless steel, aluminum, copper, and nickel.

The positive electrode current collector provides good electrical conduction between the positive electrode layer and the positive electrode casing, which serves as a terminal.

The negative electrode includes at least a negative electrode active material and may further include other components, such as a negative electrode current collector as appropriate.

The size and structure of the negative electrode are not limited and may be selected depending on the purpose. The shape of the negative electrode is not limited and may be selected depending on the purpose. Examples of the shape of the negative electrode include a rod-like shape and a disc-like shape.

The negative electrode active material is not limited and may be selected depending on the purpose. Examples of the negative electrode active material include a compound containing an alkali metal element. Examples of forms of the compound containing an alkali metal element include a metal simple substance, an alloy, a metal oxide, and a metal nitride. Examples of the alkali metal element include lithium. Examples of the metal simple substance include lithium. Examples of the alloy include alloys containing lithium, such as a lithium-aluminum alloy, a lithium-tin alloy, a lithium-lead alloy, and a lithium-silicon alloy. Examples of the metal oxide include metal oxides containing lithium, such as lithium titanium oxide. Examples of the metal nitride include metal nitrides containing lithium, such as lithium cobalt nitride, lithium iron nitride, and lithium manganese nitride.

The content of the negative electrode active material in the negative electrode is not limited and may be selected depending on the purpose.

The negative electrode active material may be included in the negative electrode in the form of a negative electrode layer composed of a mixture of the negative electrode active material with a conductant agent and a binder. The conductant agent is not limited and may be selected depending on the purpose. Examples of the conductant agent include carbon conductive materials, such as acetylene black and carbon black. The binder is not limited and may be selected depending on the purpose. Examples of the binder include polytetrafluoroethylene (PTFE), polyvinylidene fluoride (PVDF), an ethylene-propylene-butadiene rubber (EPBR), a styrene-butadiene rubber (SBR), and carboxymethyl cellulose (CMC).

The shape, size, and structure of the negative electrode current collector are not limited and may be selected depending on the purpose. The material for the negative electrode current collector is not limited and may be selected depending on the purpose. Examples of the material for the negative electrode current collector include stainless steel, aluminum, copper, and nickel.

The negative electrode current collector provides good electrical conduction between the negative electrode layer and the negative electrode casing, which serves as a terminal.

The electrolyte is not limited and may be selected depending on the purpose. Examples of the electrolyte include a nonaqueous electrolyte solution and a solid electrolyte.

Examples of the nonaqueous electrolyte solution includes a nonaqueous electrolyte solution containing a lithium salt and an organic solvent.

The lithium salt is not limited and may be selected depending on the purpose. Examples of the lithium salt include lithium hexafluorophosphate, lithium tetrafluoroborate, lithium perchlorate, lithium bis(pentafluoroethanesulfone)imide, and lithium bis(trifluoromethanesulfone)imide. The above lithium salts may be used alone or in combination of two or more.

The concentration of the lithium salt is not limited and may be selected depending on the purpose. The concentration of the lithium salt in the organic solvent is preferably 0.5 to 3 mol/L in consideration of ionic conductivity.

The organic solvent is not limited and may be selected depending on the purpose. Examples of the organic solvent include ethylene carbonate, dimethyl carbonate, propylene carbonate, diethyl carbonate, and ethyl methyl carbonate. The above organic solvents may be used alone or in combination of two or more.

The content of the organic solvent in the nonaqueous electrolyte solution is not limited and may be selected depending on the purpose. The content of the organic solvent in the nonaqueous electrolyte solution is preferably 75% to 95% by mass and is more preferably 80% to 90% by mass. If the content of the organic solvent in the nonaqueous electrolyte solution is less than 75% by mass, the viscosity of the nonaqueous electrolyte solution is high and the wettability of the electrodes with the nonaqueous electrolyte solution is low. In such a case, the internal resistance of the battery may be increased. If the content of the organic solvent in the nonaqueous electrolyte solution is more than 95% by mass, the ionic conductivity of the nonaqueous electrolyte solution is low. In such a case, the power of the battery may be reduced. Setting the content of the organic solvent in the nonaqueous electrolyte solution to fall within the above more preferable range enables a high ionic conductivity to be maintained. Furthermore, an increase in the viscosity of the nonaqueous electrolyte solution may be limited. This enables the wettability of the electrodes with the nonaqueous electrolyte solution to be maintained.

The solid electrolyte is not limited and may be selected depending on the purpose. Examples of the solid electrolyte include an inorganic solid electrolyte and a solvent-free polymer electrolyte. Examples of the inorganic solid electrolyte include a LISICON material and a perovskite material. Examples of the solvent-free polymer electrolyte include a polymer including an ethylene oxide bond.

The content of the electrolyte in the lithium-ion secondary battery is not limited and may be selected depending on the purpose.

The material for the separator is not limited and may be selected depending on the purpose. Examples of a material for the separator include paper, cellophane, polyolefin nonwoven fabric, polyamide nonwoven fabric, and glass fiber nonwoven fabric. Examples of the paper include Kraft paper, vinylon mixed paper, and synthetic pulp mixed paper. The shape of the separator is not limited and may be selected depending on the purpose. Examples of the shape of the separator include a sheet-like shape. The separator may have a single-layer structure or a multilayer structure. The size of the separator is not limited and may be selected depending on the purpose.

The material for the positive electrode casing is not limited and may be selected depending on the purpose. Examples of the material for the positive electrode casing include copper, stainless steel, and a stainless steel or iron material on which a nickel coating film is deposited. The shape of the positive electrode casing is not limited and may be selected depending on the purpose. Examples of the shape of the positive electrode casing include a shallow-dish-like shape with edges curled upward, a cylindrical shape with a bottom, and a prism-like shape with a bottom. The positive electrode casing may have a single-layer structure or a multilayer structure. Examples of the multilayer structure include a three-layer structure constituted by a nickel layer, a stainless steel layer, and a copper layer. The size of the positive electrode casing is not limited and may be selected depending on the purpose.

The material for the negative electrode casing is not limited and may be selected depending on the purpose. Examples of the material for the negative electrode casing include copper, stainless steel, and a stainless steel or iron material on which a nickel coating film is deposited. The shape of the negative electrode casing is not limited and may be selected depending on the purpose. Examples of the shape of the negative electrode casing include a shallow-dish-like shape with edges curled upward, a cylindrical shape with a bottom, and a prism-like shape with a bottom. The negative electrode casing may have a single-layer structure or a multilayer structure. Examples of the multilayer structure include a three-layer structure constituted by a nickel layer, a stainless steel layer, and a copper layer. The size of the negative electrode casing is not limited and may be selected depending on the purpose.

The shape of the lithium-ion secondary battery is not limited and may be selected depending on the purpose. Examples of the shape of the lithium-ion secondary battery include a coin-like shape, a cylindrical shape, a rectangular shape, and a sheet-like shape.

FIG. 1 is a schematic cross-sectional view of an example of the lithium-ion secondary battery according to the disclosure. The lithium-ion secondary battery illustrated in FIG. 1 is a coin-shaped lithium-ion secondary battery. The coin-shaped lithium-ion secondary battery includes a positive electrode 10 constituted by a positive electrode current collector 11 and a positive electrode layer 12, a negative electrode 20 constituted by a negative electrode current collector 21 and a negative electrode layer 22, and an electrolyte layer 30 interposed between the positive electrode 10 and the negative electrode 20. In the lithium-ion secondary battery illustrated in FIG. 1, the positive electrode current collector 11 is fixed to a positive electrode casing 41 with a current collector 43 interposed therebetween, and the negative electrode current collector 21 is fixed to a negative electrode casing 42 with a current collector 43 interposed therebetween. A gasket 44 composed of polypropylene or the like is interposed between the positive electrode casing 41 and the negative electrode casing 42 in order to seal the battery. The current collectors 43 provide electrical conduction between the positive electrode current collector 11 and the positive electrode casing 41 and between the negative electrode current collector 21 and the negative electrode casing 42 while filling the gaps therebetween. The positive electrode layer 12 is prepared using the above-described positive electrode material for secondary batteries.

The following raw materials used in examples below may be available from the companies below.
$Li_2CO_3$: Kojundo Chemical Laboratory Co., Ltd.
$FeC_2O_4 \cdot 2H_2O$: JUNSEI CHEMICAL CO., LTD.
$(NH_4)_2HPO_4$: KANTO CHEMICAL CO., INC.
$NiC_2O_4 \cdot 2H_2O$: Kojundo Chemical Laboratory Co., Ltd.
$CoC_2O_4 \cdot 2H_2O$: JUNSEI CHEMICAL CO., LTD.
$MnC_2O_4$: Kojundo Chemical Laboratory Co., Ltd.
$MgC_2O_4$: Kojundo Chemical Laboratory Co., Ltd.

Example 1

Into a container of a planetary ball mill, 1.7549 g of $Li_2CO_3$, 5.8689 g of $FeC_2O_4 \cdot 2H_2O$, 0.6624 g of $NiC_2O_4 \cdot 2H_2O$, and 7.9234 g of $(NH_4)_2HPO_4$ were charged. Subsequently, the container of a planetary ball mill was placed in a ball mill. The ball mill was driven in order to mix the raw materials with one another. The resulting mixture was fired at 600° C. for 6 hours in an argon atmosphere. Hereby, $Li_{4.75}Fe_{3.26}Ni_{0.36}(P_2O_7)_3$, that is, a positive electrode material for secondary batteries, was prepared.

Reference Example 1, Examples 2 to 15, and Comparative Examples 1 and 2

A positive electrode material for secondary batteries $Li_{4+x}(Fe_{1-z}M_z)_{4-0.5x}(P_2O_7)_3$ was prepared as in Example 1, except that the composition of the positive electrode material was changed to a specific one of the compositions described in Table 1 and the firing temperature was changed to a specific one of the firing temperatures described in Table 1. Table 2 summarizes the values x and z of the positive electrode material for secondary batteries. In the case where the divalent metal M was Ni or Co (i.e., in Examples 1 to 8), any by-product such as $Li_4P_2O_7$, $Li_2FeP_2O_7$, $Li_2MP_2O_7$, $Fe_2P_2O_7$, or $M_2P_2O_7$ was not formed in the synthesis of $Li_{4+x}(Fe_{1-z}M_z)_{4-0.5x}(P_2O_7)_3$.

TABLE 2

| | $Li_{4+x}(Fe_{1-z}M_z)_{4-0.5x}(P_2O_7)_3$ | | |
|---|---|---|---|
| | M | x | z |
| Reference example 1 | — | 0.00 | 0.0 |
| Example 1 | Ni | 0.75 | 0.1 |
| Example 2 | Ni | 0.00 | 0.2 |
| Example 3 | Ni | 0.20 | 0.3 |
| Example 4 | Ni | 0.50 | 0.5 |
| Comparative example 1 | Ni | 0.50 | 0.7 |
| Example 5 | Co | 0.00 | 0.1 |
| Example 6 | Co | 0.30 | 0.2 |
| Example 7 | Co | −0.10 | 0.3 |
| Example 8 | Co | −0.65 | 0.5 |
| Comparative example 2 | Co | 0.40 | 1.0 |
| Example 9 | Mn | 0.50 | 0.2 |
| Example 10 | Mn | 0.50 | 0.3 |
| Example 11 | Mn | 0.50 | 0.5 |
| Example 12 | Mg | 0.50 | 0.2 |
| Example 13 | Mg | 0.50 | 0.25 |
| Example 14 | Mg | 0.50 | 0.3 |
| Example 15 | Mg | 0.50 | 0.5 |

Figure 2:
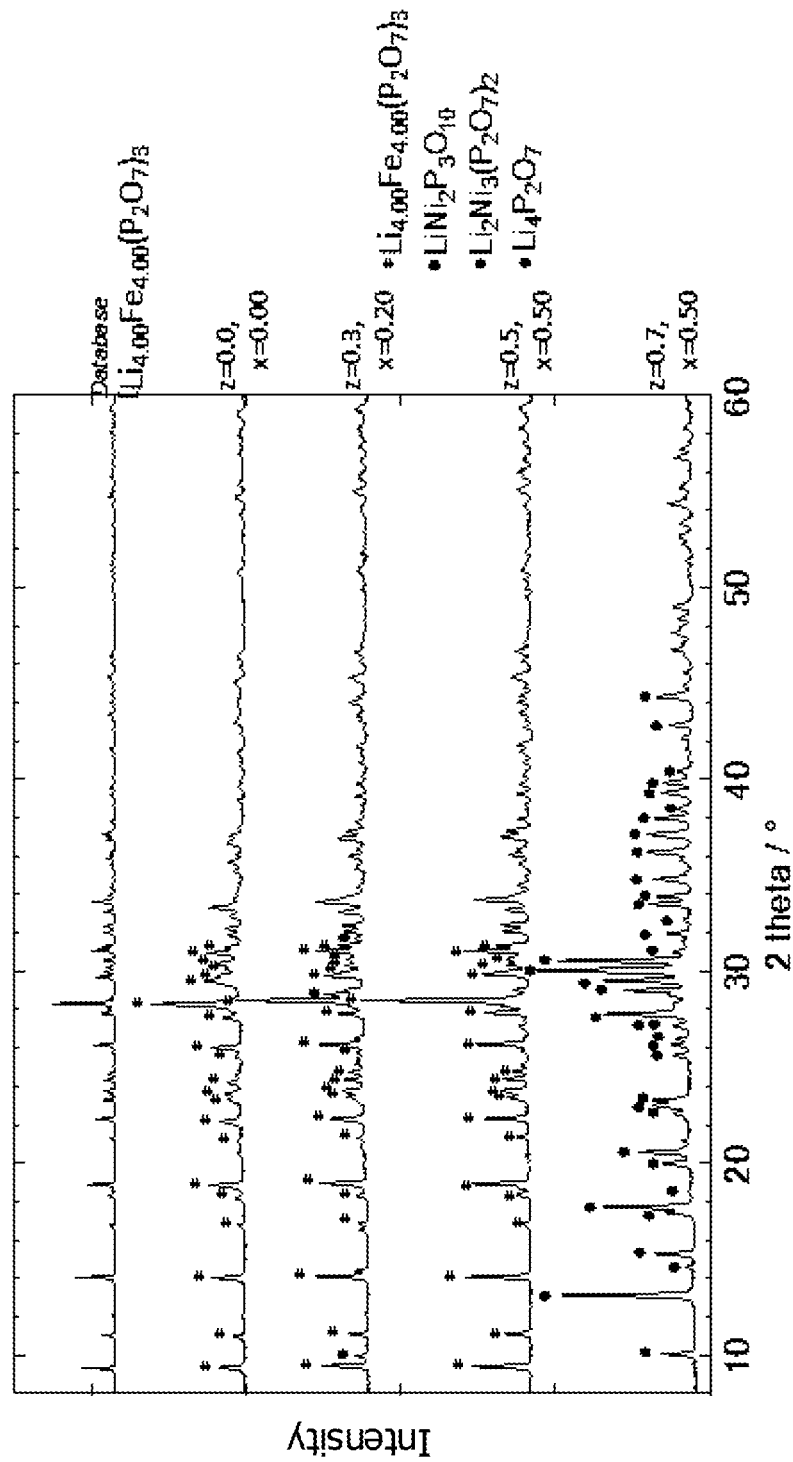
FIG. 2 illustrates examples of XRD spectra of substances prepared in Reference example 1, Example 3, Example 4, and Comparative example 1.

FIG. 2 illustrates XRD spectra (by Cu-Kα X-ray) of the substances prepared in Reference example 1 (z=0.0), Example 3 (z=0.3), Example 4 (z=0.5), and Comparative example 1 (z=0.7). The presence of the diffraction peaks confirmed that the above substances had a crystal structure. The results of a Rietveld analysis confirmed that the substances prepared in Reference example 1 and Examples 3 and 4 had a triclinic crystal phase and belonged to Space group P-1 (No. 2). The same was confirmed in Examples 1, 2, and 5 to 15 and Comparative example 2. In Examples 9 to 14, the formation of trace amounts of by-products such as $Li_2FeP_2O_7$, $Li_4P_2O_7$, and $Fe_2P_2O_7$ was confirmed in addition to the formation of the principal product, that is, triclinic $Li_{4+x}(Fe_{1-z}M_z)_{4-0.5x}(P_2O_7)_3$. In Comparative example 1 (M=Ni), it was not possible to maintain the crystal structure when z was 0.7, and a mixture of a $LiNi_2P_3O_{10}$ phase, a $Li_2Ni_3(P_2O_7)_2$ phase, and a $Li_4P_2O_7$ phase, which have a monoclinic crystal structure, was formed. This confirmed that the solid solubility limit of Ni is z<0.7. In Comparative example 2 (M=Co), the crystal structure was triclinic even

TABLE 1

Figure 4:
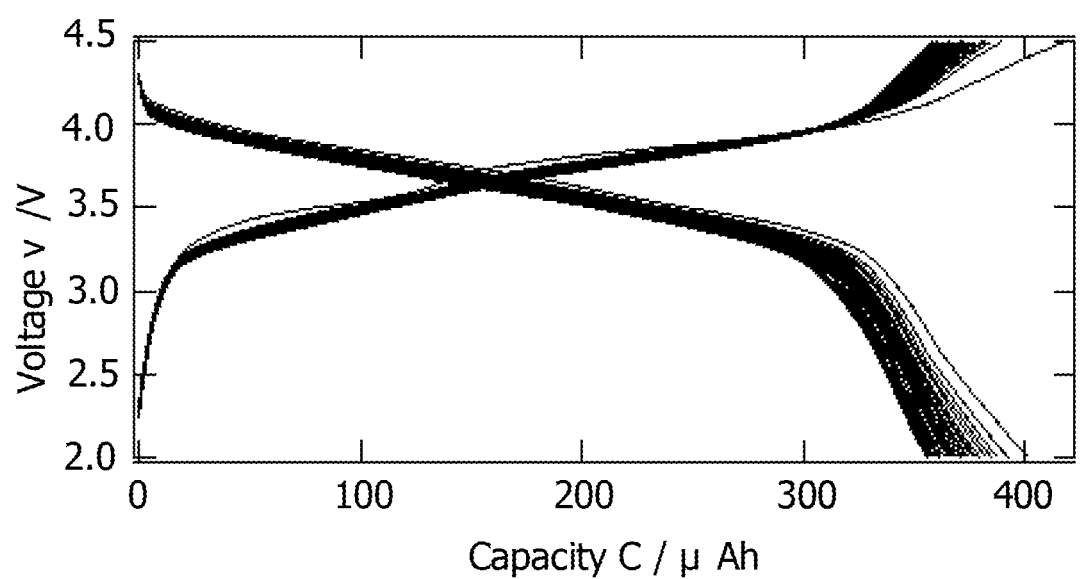
FIG. 4 illustrates an example of a charge/discharge curve of a half cell that includes a positive electrode material prepared in Example 4 which was measured when the half cell was charged and discharged at a constant current 20 cycles.

| | $Li_2CO_3$ | $FeC_2O_4 \cdot 2H_2O$ | $NiC_2O_4 \cdot 2H_2O$ | $CoC_2O_4 \cdot 2H_2O$ | $MnC_2O_4$ | $MgC_2O_4$ | $(NH_4)_2HPO_4$ | Firing temperature (° C.) |
|---|---|---|---|---|---|---|---|---|
| Reference example 1 | 1.4778 g | 7.1956 g | — | — | — | — | 7.9234 g | 600 |
| Example 1 | 1.7549 g | 5.8689 g | 0.6624 g | — | — | — | 7.9234 g | 600 |
| Example 2 | 1.4778 g | 5.7565 g | 1.4619 g | — | — | — | 7.9234 g | 500 |
| Example 3 | 1.5517 g | 4.9110 g | 2.1381 g | — | — | — | 7.9234 g | 500 |
| Example 4 | 1.6625 g | 3.3729 g | 3.4264 g | — | — | — | 7.9234 g | 600 |
| Comparative example 1 | 1.6625 g | 2.0238 g | 4.7970 g | — | — | — | 7.9234 g | 600 |
| Example 5 | 1.4778 g | 6.4760 g | — | 0.7319 g | — | — | 7.9234 g | 550 |
| Example 6 | 1.5886 g | 5.5406 g | — | 1.4090 g | — | — | 7.9234 g | 550 |
| Example 7 | 1.4409 g | 5.0999 g | — | 2.2232 g | — | — | 7.9234 g | 600 |
| Example 8 | 1.2377 g | 3.8901 g | — | 3.9570 g | — | — | 7.9234 g | 600 |
| Comparative example 2 | 1.6256 g | — | — | 6.9534 g | — | — | 7.9234 g | 600 |
| Example 9 | 1.6625 g | 5.3967 g | — | — | 1.0722 g | — | 7.9234 g | 550 |
| Example 10 | 1.6625 g | 4.7221 g | — | — | 1.6083 g | — | 7.9234 g | 600 |
| Example 11 | 1.6625 g | 3.3729 g | — | — | 2.6804 g | — | 7.9234 g | 600 |
| Example 12 | 1.6625 g | 5.3967 g | — | — | — | 0.8424 g | 7.9234 g | 600 |
| Example 13 | 1.6625 g | 5.0594 g | — | — | — | 1.0530 g | 7.9234 g | 600 |
| Example 14 | 1.6625 g | 4.7221 g | — | — | — | 1.2636 g | 7.9234 g | 650 |
| Example 15 | 1.6625 g | 3.3729 g | — | — | — | 2.1060 g | 7.9234 g | 600 | when z was 1.0. This confirmed that the solid solubility limit of Co does not exist. Table 3 summarizes the results of calculation of the lattice constant of each of the triclinic structures formed in Examples 1 to 14, Reference example 1, and Comparative example 2. The results confirm that dissolving M in the crystal structure may change the lattice constant of the crystal structure and reduce the volume of the lattice. In Table 3, the parenthesized values are standard deviations.

the positive electrode material for secondary batteries which was prepared in Reference example 1 had a high voltage. FIG. 4 illustrates the charge/discharge curves (20 cycles) of the positive electrode material for secondary batteries which was prepared in Example 4 (M=Ni, z=0.5, x=0.5). The charge/discharge curves illustrated in FIG. 4 confirmed that the positive electrode material for secondary batteries which was prepared in Example 4 also had a high voltage. A comparison of the charge/discharge curves of the positive

TABLE 3

| | M | z | a/Å | b/Å | c/Å | α/° | β/° | γ/° | V/Å³ |
|---|---|---|---|---|---|---|---|---|---|
| Reference example 1 | — | 0 | 6.3813(3) | 8.5635(5) | 10.0275(6) | 107.937(3) | 89.8626(10) | 93.0035(9) | 520.56(5) |
| Example 1 | Ni | 0.1 | 6.3289(3) | 8.4826(5) | 9.9250(5) | 108.031(5) | 89.862(6) | 93.012(5) | 505.90(5) |
| Example 2 | Ni | 0.2 | 6.3243(3) | 8.4629(5) | 9.9201(5) | 107.953(5) | 89.827(6) | 92.911(5) | 504.40(5) |
| Example 3 | Ni | 0.3 | 6.3247(2) | 8.4423(3) | 9.9107(4) | 108.007(3) | 89.898(4) | 92.876(3) | 502.57(3) |
| Example 4 | Ni | 0.5 | 6.30967(19) | 8.3998(3) | 9.8952(4) | 108.028(3) | 89.979(3) | 92.755(3) | 498.07(3) |
| Example 5 | Co | 0.1 | 6.3387(3) | 8.4907(5) | 9.9511(4) | 107.919(5) | 89.868(6) | 92.997(5) | 508.83(5) |
| Example 6 | Co | 0.2 | 6.3382(6) | 8.4786(11) | 9.9508(9) | 107.932(11) | 89.854(14) | 93.003(11) | 508.02(10) |
| Example 7 | Co | 0.3 | 6.3189(9) | 8.4543(15) | 9.9355(13) | 107.906(14) | 89.947(18) | 92.945(16) | 504.34(14) |
| Example 8 | Co | 0.5 | 6.3189(12) | 8.451(2) | 9.9382(17) | 107.89(2) | 89.95(2) | 92.95(2) | 504.31(8) |
| Comparative example 2 | Co | 1 | 6.3009(7) | 8.4132(10) | 9.9367(16) | 107.894(2) | 90.247(2) | 92.782(2) | 500.62(17) |
| Example 9 | Mg | 0.2 | 6.3234(4) | 8.4688(7) | 9.9547(6) | 107.962(7) | 90.018(8) | 92.953(7) | 506.36(6) |
| Example 10 | Mg | 0.25 | 6.3216(2) | 8.4620(4) | 9.9569(3) | 107.908(4) | 90.066(4) | 92.928(4) | 505.90(5) |
| Example 11 | Mg | 0.3 | 6.3165(5) | 8.4501(9) | 9.9549(8) | 107.741(8) | 90.281(8) | 92.831(7) | 503.35(8) |
| Example 12 | Mn | 0.2 | 6.3458(4) | 8.5367(7) | 9.9404(6) | 107.888(6) | 90.015(8) | 93.060(6) | 511.66(6) |
| Example 13 | Mn | 0.3 | 6.3556(2) | 8.5454(4) | 9.9430(3) | 107.989(3) | 90.086(4) | 93.026(3) | 512.82(3) |
| Example 14 | Mn | 0.5 | 6.3669(11) | 8.5650(19) | 9.9381(17) | 108.019(19) | 90.21(2) | 93.062(18) | 514.51(18) |

Half cells were each prepared using a specific one of the positive electrode materials for secondary batteries (i.e., positive electrode active materials) prepared in Examples 1 to 15, Reference example 1, and Comparative example 1 and 2. The positive electrode used was prepared using an electrode mixture containing the positive electrode active material, conductive carbon (KETJENBLACK, ECP600JD produced by Lion Specialty Chemicals Co., Ltd.), and polyvinylidene fluoride (KF #1300 produced by KUREHA CORPORATION) at a mass ratio of 85:10:5. The electrolyte solution used was an electrolyte solution produced by KISHIDA CHEMICAL Co., Ltd., which was prepared by dissolving 1 M of lithium hexafluorophosphate ($LiPF_6$) in a mixed solvent containing ethylene carbonate (EC) and dimethyl carbonate (DMC) at a volume ratio EC:DMC=1:2. The negative electrode used was composed of metal lithium.

Each of the half cells was subjected to a constant-current charge-discharge test under the following conditions. The charge of the half cells and discharge of the half cells were terminated when a specific voltage was reached. Specifically, the charge of the half cells was terminated when the voltage reached 4.5 V, and the discharge of the half cells was terminated when the voltage reached 2.0 V. An interval of 10 minutes was placed between each pair of charging and discharging in an open-circuit state. Hereinafter, a pair of charge and discharge is referred to as "one cycle".

The half cells prepared using the positive electrode materials for secondary batteries of Examples 1 to 15, Reference example 1, and Comparative example 2 had charge and discharge capacities of about 100 mAh/g. In contrast, the half cell prepared using the positive electrode material for secondary batteries of Comparative example 1 had a capacity of about 35 mAh/g.

Figure 3:
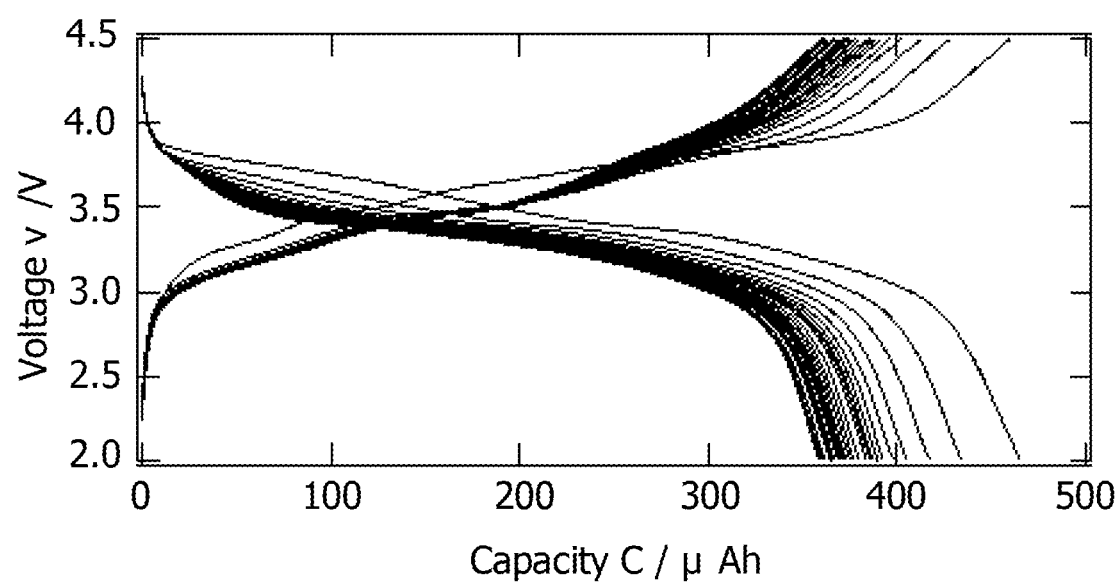
FIG. 3 illustrates an example of a charge/discharge curve of a half cell that includes a positive electrode material prepared in Reference example 1 which was measured when the half cell was charged and discharged at a constant current 20 cycles.

FIG. 3 illustrates the charge/discharge curves of the positive electrode material for secondary batteries which was prepared in Reference example 1 (z=0.0, x=0.0). The charge/discharge curves illustrated in FIG. 3 confirmed that electrode materials prepared in Reference Example 1 (FIG. 3) and Example 4 (FIG. 4) confirmed that the reduction in capacity due to the repeated cycles (hereinafter, this reduction is referred to as "cycle characteristic") was smaller in Example 4 than in Reference example 1.

Figure 5:
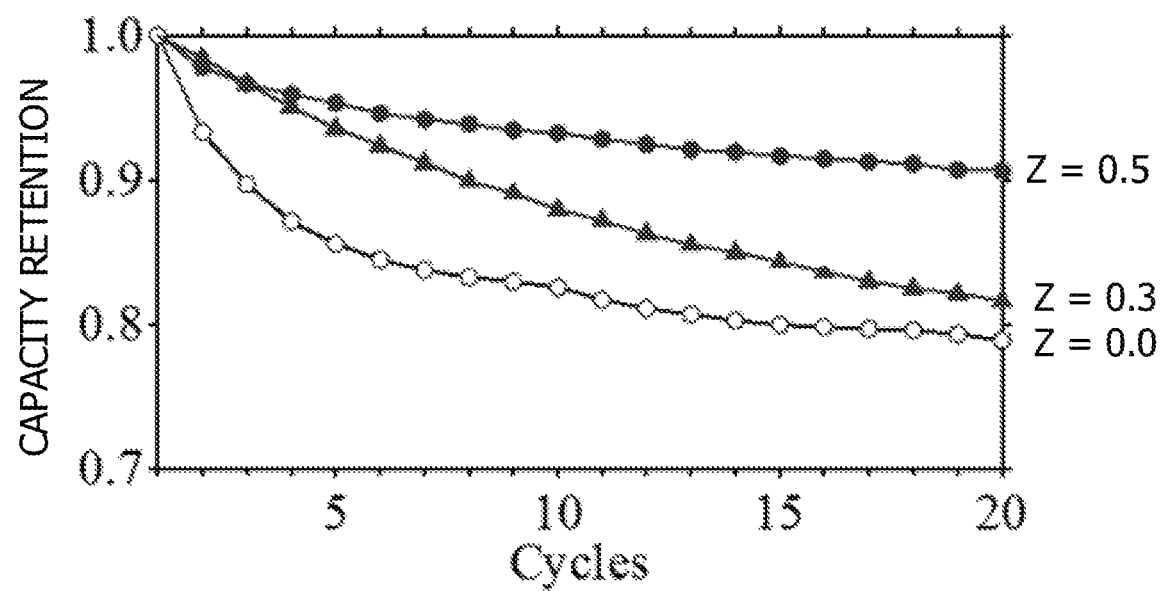
FIG. 5 is an example of a graph illustrating the relationship between the number of cycles each of half cells each including a specific one of positive electrode materials prepared in Example 3, Example 4, and Reference example 1 was charged and discharged and the capacity retention of the half cell.

FIG. 5 is a graph illustrating the relationship between the number of cycles each of half cells of Reference example 1 (z=0.0), Example 3 (M=Ni, z=0.3), and Example 4 (M=Ni, z=0.5) was charged and discharged and the capacity retention of the half cell. As is clear from the results illustrated in FIG. 5, the higher the replacement rate z, the higher the degree of enhancement in cycle characteristic.

Figure 6:
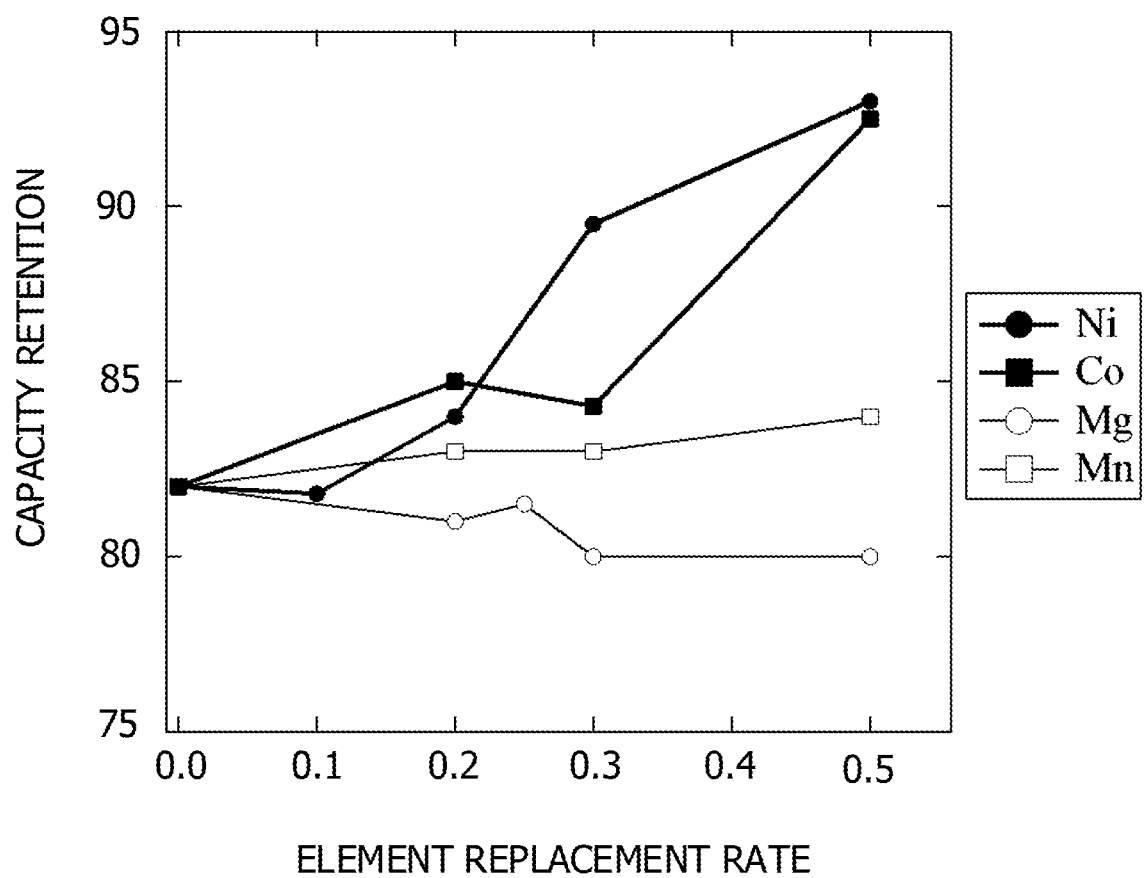
FIG. 6 is an example of a graph illustrating changes in capacity retention with replacement rates of Ni, Co, Mg, and Mn.

FIG. 6 illustrates a change in capacity retention with the proportion of each of the divalent metal elements M (i.e., Ni, Co, Mn, and Mg) to Fe (hereinafter, this proportion is referred to as "element replacement rate"). The term "capacity retention" used herein refers to the ratio of discharge capacity in the tenth cycle to discharge capacity in the first cycle. In the case where the divalent metal M was Ni, capacity retention was markedly increased when z≥0.30. In the case where the divalent metal M was Co, capacity retention was markedly increased when z=0.50. Accordingly, it is considered that, in the case where M is Co, capacity retention may be further increased when 0.50<z<1.0. In the case where the divalent metal M was Mg or Mn, capacity retention was substantially the same as in the case where z=0. The above results confirmed that the positive electrode material for secondary batteries according to the above-described embodiment is capable of exhibiting a high voltage while containing inexpensive iron and capable of increasing capacity retention depending on the type of divalent metal element used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A positive electrode material for a secondary battery, wherein the positive electrode material includes a triclinic crystal structure and is represented by $Li_{4+x}(Fe_{1-z}Mg_z)_{4-0.5x}(P_2O_7)_3$, where $-0.65 \leq x \leq 0.75$, $0.0 < z \leq 0.7$.

2. The positive electrode material according to claim 1, wherein the crystal structure belongs to Space group P-1.

3. A lithium-ion secondary battery comprising:
a positive electrode including the positive electrode material for a secondary battery;
a negative electrode; and
an electrolyte,
wherein the positive electrode material includes a triclinic crystal structure and is represented by $Li_{4+x}(Fe_{1-z}Mg_z)_{4-0.5x}(P_2O_7)$, where $-0.65 \leq x \leq 0.75$, $0.0 < z \leq 0.7$.

4. The lithium-ion secondary battery according to claim 3, wherein the crystal structure belongs to Space group P-1.

5. A method for manufacturing a positive electrode material for a secondary battery, the method comprising:
generating a mixture by mixing a lithium source, an iron source, a magnesium source, and a phosphate source with one another; and
performing a heat treatment on the mixture to acquire a positive electrode material for secondary batteries which includes a triclinic crystal structure and is represented $Li_{4+x}(Fe_{1-z}Mg_z)_{4-0.5x}(P_2O_7)_3$, where $-0.65 \leq x \leq 0.75$, $0.0 < z \leq 0.7$.

6. The method according to claim 5, wherein the heat treatment is performed at 470° C. or more and 720° C. or less.

7. The method according to claim 5, wherein the heat treatment is performed in an inert atmosphere.

* * * * *